United States Patent
Yamaguchi (10) Patent No.: US 7,405,840 B2
(45) Date of Patent: Jul. 29, 2008

(54) IMAGE SCANNING AND PRINTING DEVICE

(75) Inventor: Tetsuharu Yamaguchi, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 961 days.

(21) Appl. No.: 10/680,984

(22) Filed: Oct. 7, 2003

(65) Prior Publication Data
US 2004/0085582 A1 May 6, 2004

(30) Foreign Application Priority Data
Nov. 5, 2002 (JP) .............................. 2002-321024

(51) Int. Cl.
*G06F 15/00* (2006.01)
*G03G 15/00* (2006.01)
(52) U.S. Cl. ........................ 358/1.18; 399/82
(58) Field of Classification Search ................ 358/1.18, 358/1.14, 1.9, 1.13; 715/861, 859, 527, 530; 717/101, 104, 139; 399/79.82, 85; 400/76
See application file for complete search history.

(56) References Cited

U.S. PATENT DOCUMENTS

2001/0043359 A1* 11/2001 Mori et al. ................ 358/1.15
2003/0113130 A1* 6/2003 Robertson et al. ............ 399/82
2003/0133168 A1* 7/2003 Fresk et al. ................. 358/401
2003/0160975 A1* 8/2003 Skurdal et al. ............... 358/1.2

FOREIGN PATENT DOCUMENTS

| JP | 04-175774 | 6/1992 |
| JP | 2001-169087 | 6/2001 |
| JP | 2001-191582 | 7/2001 |
| JP | 2001-191617 | 7/2001 |
| JP | 2001-328307 | 11/2001 |
| JP | 2001-328322 | 11/2001 |

* cited by examiner

*Primary Examiner*—Saeid Ebrahimi
(74) *Attorney, Agent, or Firm*—Hogan & Hartson LLP (57) ABSTRACT

An image scanning and printing device includes a printing unit that prints an image onto each of multiple sheets of recording papers in one printing process by a multi-up printing process and a control unit that controls to select and execute the multi-up printing process when a size of the recording paper, which is obtained based on a size of an original document and an output magnification, is less than half of a maximum recording paper size, and a number of sheets to be printed, which is obtained based on a number of original documents and a number of sets of sheets to be printed, is two sheets or more, and to select and execute a one-up printing process otherwise.

18 Claims, 6 Drawing Sheets

| TYPE NO. | DATA 1 | DATA 2 |
|---|---|---|
| 0 | MONOCHROME DATA | MONOCHROME DATA |
| 1 | MONOCHROME DATA | COLOR DATA |
| 2 | COLOR DATA | MONOCHROME DATA |
| 3 | COLOR DATA | COLOR DATA |

FIG. 6B

| TYPE NO. | PRINTING PROCEDURE | | | | | |
|---|---|---|---|---|---|---|
| 0 | FEED | K | K | DIS-CHARGE | | |
| 1-3 | FEED | YY | MM | CC | KK | DIS-CHARGE |
| (1) | FEED | K | Y | M | C | K | DIS-CHARGE |
| (2) | FEED | Y | M | C | K | K | DIS-CHARGE | ns
IMAGE SCANNING AND PRINTING DEVICE

BACKGROUND OF THE INVENTION

1. Field of the Invention

The present invention relates to an image scanning and printing device, and more specifically to an image scanning and printing device which prints an image onto two sheets of recording papers or more in one printing process.

2. Description of Related Art

A conventional electro-photographic typed image scanning and printing device, which prints out a color image by a 4-cycle method, uses toner of four colors, blacK (K), Cyan (C), Magenta (M) and Yellow (Y). One cycle which begins with a development of an image based on color data of each of the colors and ends with a transfer of the image onto a transfer medium, is executed respectively on the color data of each of the colors. Then, by overlapping the images one on the other on the transfer medium, the formed color image is collectively transferred onto a recording paper. Under the printing process of the color image by the 4-cycle method, the image is formed on the transfer medium for each of the four colors KCMY, and then, the color image is printed onto a recording paper. As a result, the printing process of the color image required a printing time that is approximately four times longer than a printing time of a printing process of a monochrome image. Thus, there are problems that a longer period of time is required for printing when printing a color image onto multiple sheets of recording paper.

Figure 6A:
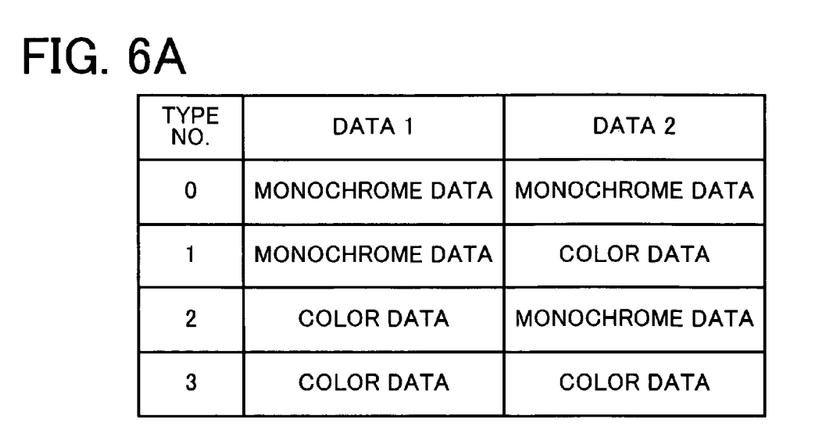
FIG. 6A is a view showing a determination of whether or not the two-up printing process can be executed.
Figure 6B:
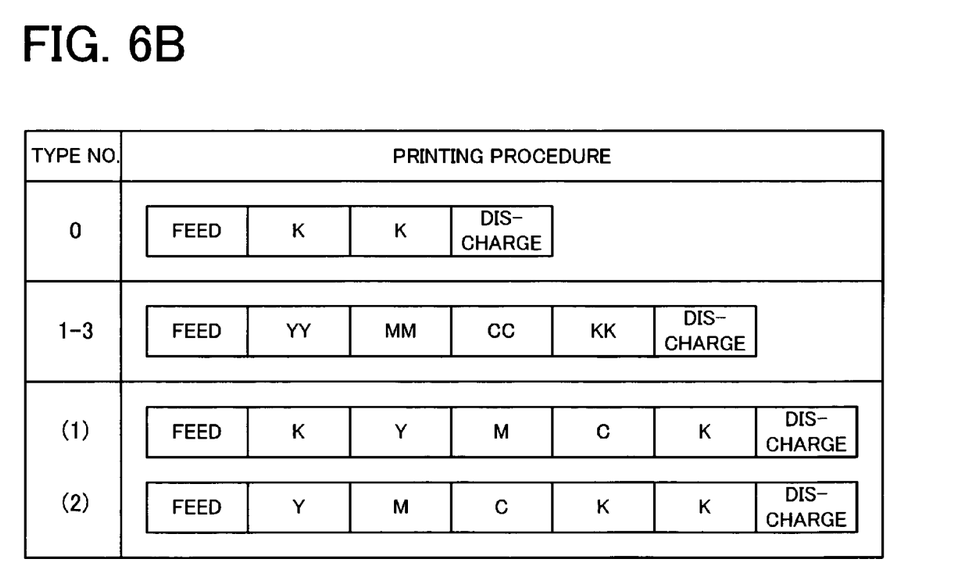
FIG. 6B is a view showing a printing procedure in a conventional image printing and scanning device.

On the contrary, there is a printing device which can carry out a two-up printing process to print an image onto each of two sheets of recording papers that are supplied continuously in one printing process, like when printing onto one sheet of recording paper, in case it is instructed to print the image onto multiple sheets of recording papers of a prescribed size or smaller. For image data of unprocessed two pages that are received oldest by a data receiving unit, the printing device determines whether each image data is color data or monochrome data. Then, as shown in FIG. 6A and FIG. 6B, in case of a type number 0 in which both data are monochrome data, the image of only the K component is formed on the transfer medium, and the image is printed by a one-up monochrome printing process. In case of type numbers 1 through 3 in which the image data includes color data, the image is printed by a two-up color printing process. Further, in the one-up monochrome printing process of the type number 0, since a second sheet of the recording paper is supplied during the printing process of the image of the first page, the image of the second page is printed immediately after the first page is printed.

Therefore, when the image data of the two pages are both color data, by carrying out the two-up color printing process, the image can be printed within approximately half the time required by the one-up color printing process where the image of each page is printed one page at a time. Moreover, when the image data of the two pages are color data and monochrome data, the image can be printed in a shorter period of time than when printing by the type numbers 1 and 2 in which the image is printed by the one-up color printing process and the one-up monochrome printing process.

In the above-described printing device, it is determined and controlled whether or not to carry out the two-up color printing process based on the image data of the unprocessed two pages that are received by the data receiving unit. Therefore, it cannot be determined whether or not a two-up color printing process can be carried out until the image data of the original document is read into the data receiving unit when carrying out a printing process or the like.

SUMMARY OF THE INVENTION

The present invention was made in consideration to the above-described circumstance. An advantage of the present invention is to provide an image scanning and printing device which can determine and control whether or not a multi-up printing process can be carried out based on the size of an original document, an output magnification, a number of original documents, and a number of sets of sheets to be printed, before a scanning process of multiple pages of original documents has been completed.

According to a first aspect of the present invention, an image scanning and printing device can carry out a multi-up printing process to print an image onto each of a multiple sheets of recording papers in one printing process. When a size of the recording paper obtained based on the size of the original document and the output magnification is less than half of a maximum recording paper size which can be printed by the image scanning and printing device, and the number of sheets to be printed, which is obtained based on the number of original documents and the number of sets of sheets to be printed, is two sheets or more, the multi-up printing process is selected and executed. In other cases, a one-up printing process is selected and executed.

According to the first aspect, it is determined whether or not the multi-up printing process can be carried out based on the size of the recording paper to be printed with an image and the number of sheets to be printed. Therefore, it can be determined whether or not the multi-up printing process can be carried out even when the scanning of the image data of multiple pages of original documents has not completed. As a result, compared with an image scanning and printing device which determines whether or not a multi-up printing process can be carried out in accordance with information of the scanned image data, the image scanning and printing device of the present invention can determine at an earlier stage, whether or not the multi-up printing process can be carried out.

According to a second aspect of the present invention, an image scanning and printing device can carry out a multi-up printing process to print image onto each of multiple pages of recording papers in one printing process. When a size of a recording paper obtained based on a size of the original document and the output magnification is less than half of a maximum recording paper size which can be printed by the image scanning and printing device, and a next page of original documents placed on an automatic document feeder is detected at a stage, a first page of the original documents is scanned, or when an original document is placed on a flat bed scanner or the automatic document feeder, and a number of sets of sheets to be printed is two sets or more, a multi-up printing process is selected and executed. In other cases, a one-up printing process is selected and executed. As a result, it can be easily determined and controlled, whether or not the multi-up printing process can be carried out.

According to a third aspect of the present invention, an image printing and scanning device converts the image data of the scanned original document into n-types of color data for first color data to n-th color data, and prints the image data onto a recording paper based on each of the color data. When scanning multiple pages of original documents and executing a multi-up printing process, the image data of the multiple pages of the original documents is respectively converted into at least the first color data, and an operation to print the image data onto a recording paper starts. As a result, compared with the conventional image scanning and printing device which carries out a multi-up printing process after converting the image into all n-types of color data for each of the pages, the printing process can be started at an earlier stage.

DETAILED DESCRIPTION OF THE PREFERRED EMBODIMENTS

Figure 1:
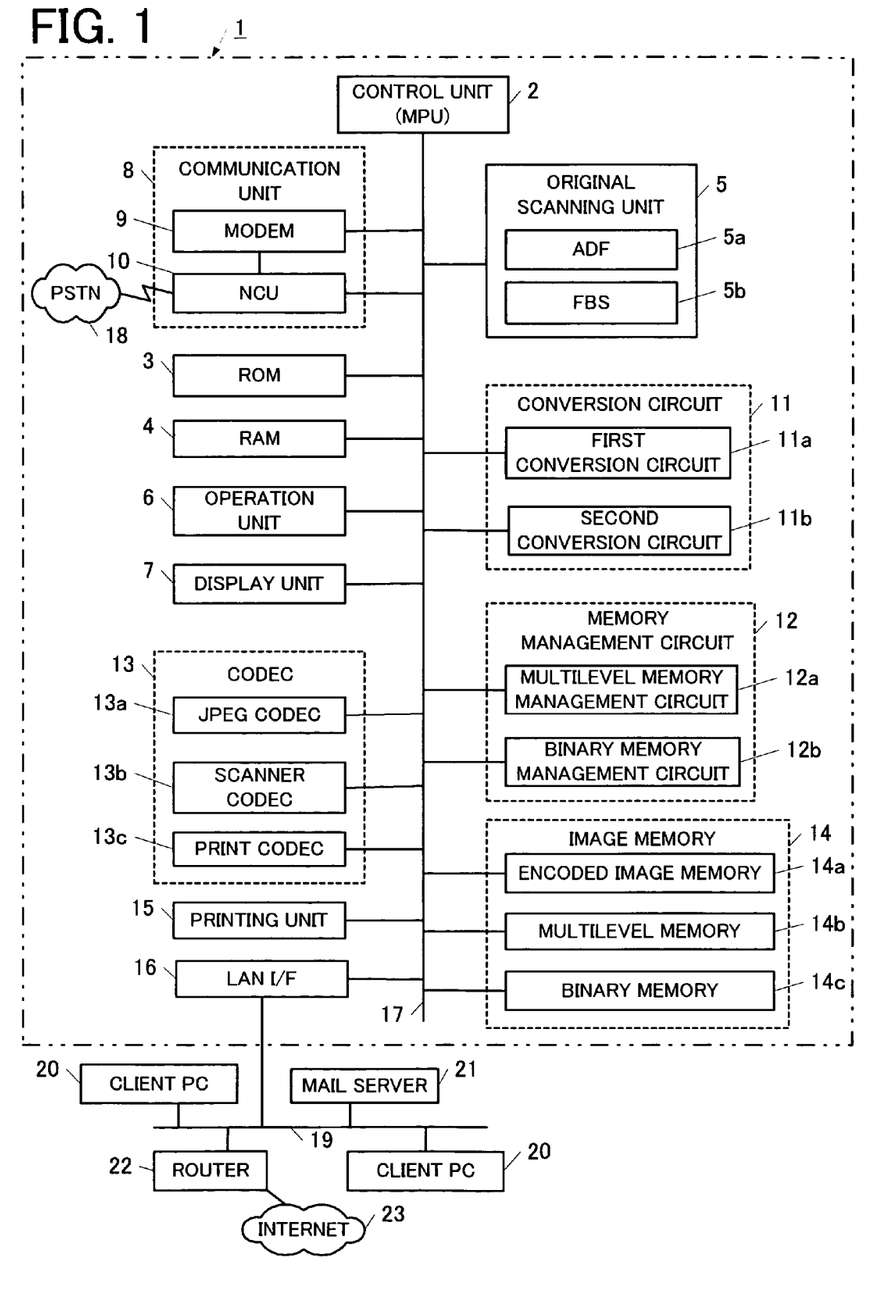
FIG. 1 is a block diagram showing an example of an inner configuration of an image scanning and printing device according to an embodiment of the present invention.

An image scanning and printing device according to an embodiment of the present invention will be described with reference to the drawings in which the image scanning and printing device is applied to a multifunction peripheral having a copy function, a facsimile function, an Internet facsimile function, a scanner function, and a printer function. As shown in FIG. 1, an image scanning and printing device 1 includes a control unit (Micro Processing Unit (MPU)) 2, a Read Only Memory (ROM) 3, a Random Access Memory (RAM) 4, an original scanning unit 5, an operation unit 6, a display unit 7, a communication unit 8, a conversion circuit 11, a memory management circuit 12, a codec 13, an image memory 14, a printing unit 15, and a Local Area Network Interface (LAN I/F) 16. Each of the parts 2 through 16 is connected by a bus 17 in a manner that a communication can be carried out.

The control unit 2 controls each of the parts of the image scanning and printing device 1 in accordance with a prescribed program.

The ROM 3 is a memory which stores various programs for controlling operations of each of the parts of the image scanning and printing device 1 by the control unit 2. For example, the ROM 3 stores a determination process program for determining and controlling whether or not a multi-up printing process can be carried out when printing image data onto a recording paper. In addition, the ROM 3 stores an image processing program for carrying out a correction, a color conversion or the like that are carried out prior to the printing process of the image data scanned by the original scanning unit 5 onto a recording paper by the printing unit 15.

The RAM 4 is a memory that functions as a storage unit which stores a registered facsimile number, an electronic mail address or the like, and as a storage unit which temporarily stores various data such as a size of a recording paper and a number of sheets to be printed. Further, the size of the recording paper is obtained based on a size of original documents placed on the original scanning unit 5 for printing, and an output magnification configured from the operation unit 6. The number of sheets to be printed is obtained based on a number of original documents placed on the original scanning unit 5, and a number of sets of sheets to be printed configured from the operation unit 6.

The original scanning unit 5 includes an Automatic Document Feeder (ADF) 5a and a Flat Bed Scanner (FBS) 5b. The original scanning unit 5 scans image data of an original document by a color Charge Coupled Device (CCD), and detects a size of the original document. After scanning the original document, the ADF 5a detects whether or not there is an original document of a next page.

The operation unit 6 includes operation keys such as a ten-key numeric pad, a start key, a cursor key or the like. The ten-key numeric pad is used for inputting a facsimile number, a number of sets of sheets to be printed or the like. The start key is used for instructing a start of a scanning process of an original document placed on the original scanning unit 5, and a facsimile transmission. The cursor key is used for carrying out various configurations. When the image scanning and printing device 1 can carry out a multi-up printing process, a configuration for whether or not to automatically select and execute the multi-up printing process is carried out from the operation unit 6.

The display unit 7 includes a liquid crystal display or a Light Emitting Diode (LED) lamp to display information relating to a status of the image scanning and printing device 1, an input screen for inputting various operation instructions, an error alarm, a configuration status, an operation status or the like.

The communication unit 8 includes a modem 9 and a Network Control Unit (NCU) 10. The modem 9 modulates and demodulates transmitting and received data in accordance with the International Telecommunication Union-Telecommunications (ITU-T) Recommendation V.34 standard or a similar standard. The NCU 10 is a network control device which makes or disconnects a phone call by controlling a telephone line. The NCU 10 is connected to a Public Switched Telephone Network (PSTN) 18.

The conversion circuit 11 includes a first conversion circuit 11a and a second conversion circuit 11b. The first conversion circuit 11a carries out various corrections such as a shading correction and a line correction on image data of a Red Green Blue (RGB) color system scanned by the original scanning unit 5. In addition, the first conversion circuit 11a converts the image data of the RGB color system into a L*a*b color system. The second conversion circuit 11b converts the image data, which is converted into the L*a*b color system by the first conversion circuit 11a, into an output color system of blacK, Cyan, Magenta and Yellow (KCMY). In addition, the second conversion circuit 11b carries out a binarization process by carrying out an error diffusion process or the like. Further, when printing out a color original document in monochrome, color multilevel data scanned by the original scanning unit 5 is converted into monochrome multilevel data by the first conversion circuit 11a.

The memory management circuit 12 includes a multilevel memory management circuit 12a and a binary memory management circuit 12b. The multilevel memory management circuit 12a is a circuit for managing to store into a multilevel memory 14b, the image data processed by the first conversion circuit 11a, and to output to a prescribed destination, the image data stored in the multilevel memory 14b. The binary memory management circuit 12b is a circuit for managing to store into a binary memory 14c, the image data processed and binarized by the second conversion circuit 11b and the image data decoded by the print codec 13c, and to output to a prescribed destination, the image data stored in the binary memory 14c.

The codec 13 encodes and decodes in accordance with a prescribed protocol. The codec 13 includes a Joint Photographic Experts Group (JPEG) codec 13a, a scanner codec 13*b* and a print codec 13*c*. The JPEG codec 13*a* encodes the image data stored in the multilevel memory 14*b* in accordance with the JPEG method when transmitting the image data stored in the multilevel memory 14*b* to a client Personal Computer (PC) 20. The scanner codec 13*b* encodes the image data stored in the binary memory 14*c* in accordance with Modified Huffman (MH), Modified Read (MR), or Modified Modified Read (MMR) method or the like. The scanner codec 13*b* also encodes the image data in accordance with a Tagged Image File Format (TIFF) which is an image format generally used as a file attachable to an electronic mail. The print codec 13*c* decodes the image data stored in the encoded memory 14*a* into each of the color data KCMY according to a printing process of the printing unit 15 for printing out the image data onto a recording paper.

The image memory 14 includes an encoded memory 14*a*, a multilevel memory 14*b*, and a binary memory 14*c*. The encoded memory 14*a* temporarily stores image data received by facsimile or received from the client PC 20, or image data scanned by the original scanning unit 5 and encoded. The multilevel memory 14*b* temporarily stores multilevel image data converted into the L*a*b color system by the first conversion circuit 11*a*. The binary memory 14*c* temporarily stores image data binarized by the second conversion circuit 11*b* or the like.

Figure 2:
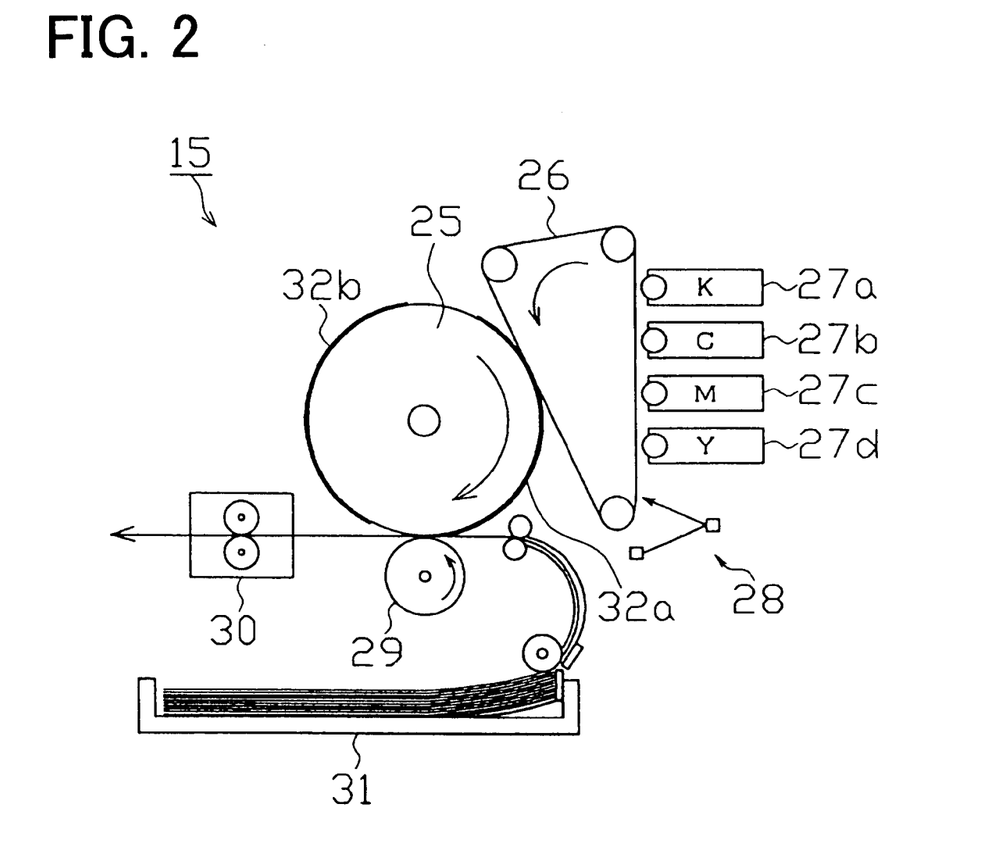
FIG. 2 is a schematic diagram of a printing unit which can carry out a two-up printing process.

The printing unit 15 adopts an electro-photographic method, and prints onto a recording paper, image data scanned by the original scanning unit 5, image data received by facsimile or the like, after executing processing such as a white mask or a smoothing on the image data. As shown in FIG. 2, the printing unit 15 includes an intermediate transfer drum 25, an intermediate transfer belt 26, toner 27, an exposure device 28, a transfer roller 29, a fuser 30, and a paper tray 31 or the like.

The LAN I/F 16 includes an interface for a Local Area Network (LAN) 19. The LAN I/F 16 connects the image scanning and printing device 1, and the client PC 20, the mail server 21 or the like via the LAN 19 in a manner that a communication can be carried out.

The image scanning and printing device 1 having the above-described configuration is connected to the client PC 20, the mail server 21 and the router 22 via the LAN 19 in a manner that a communication can be carried out. The image scanning and printing device 1 includes a copy function, an Internet facsimile function, a facsimile function, and a network printer function. The copy function is a function for printing onto a recording paper, the image data scanned by the original scanning unit 5. The Internet facsimile function is a function for transmitting and receiving image data attached to an electronic mail to another Internet facsimile machine (not shown in the drawing) or the like through the Internet 23. The facsimile function is a function for carrying out a facsimile transmission and reception to another G3 facsimile machine (not shown in the drawings) through the PSTN 18. The network printer function is a function for receiving the image data transmitted from the client PC 20 through the LAN 19 and printing the image data onto a recording paper.

Next, referring to FIG. 1 and FIG. 3, a flow of data transfer in an image processing will be described. Further, the data transfer in the image processing is executed before the image data of the original document scanned by the original scanning unit 5 is converted into four types of color data KCMY and printed onto a recording paper.

Figure 3:
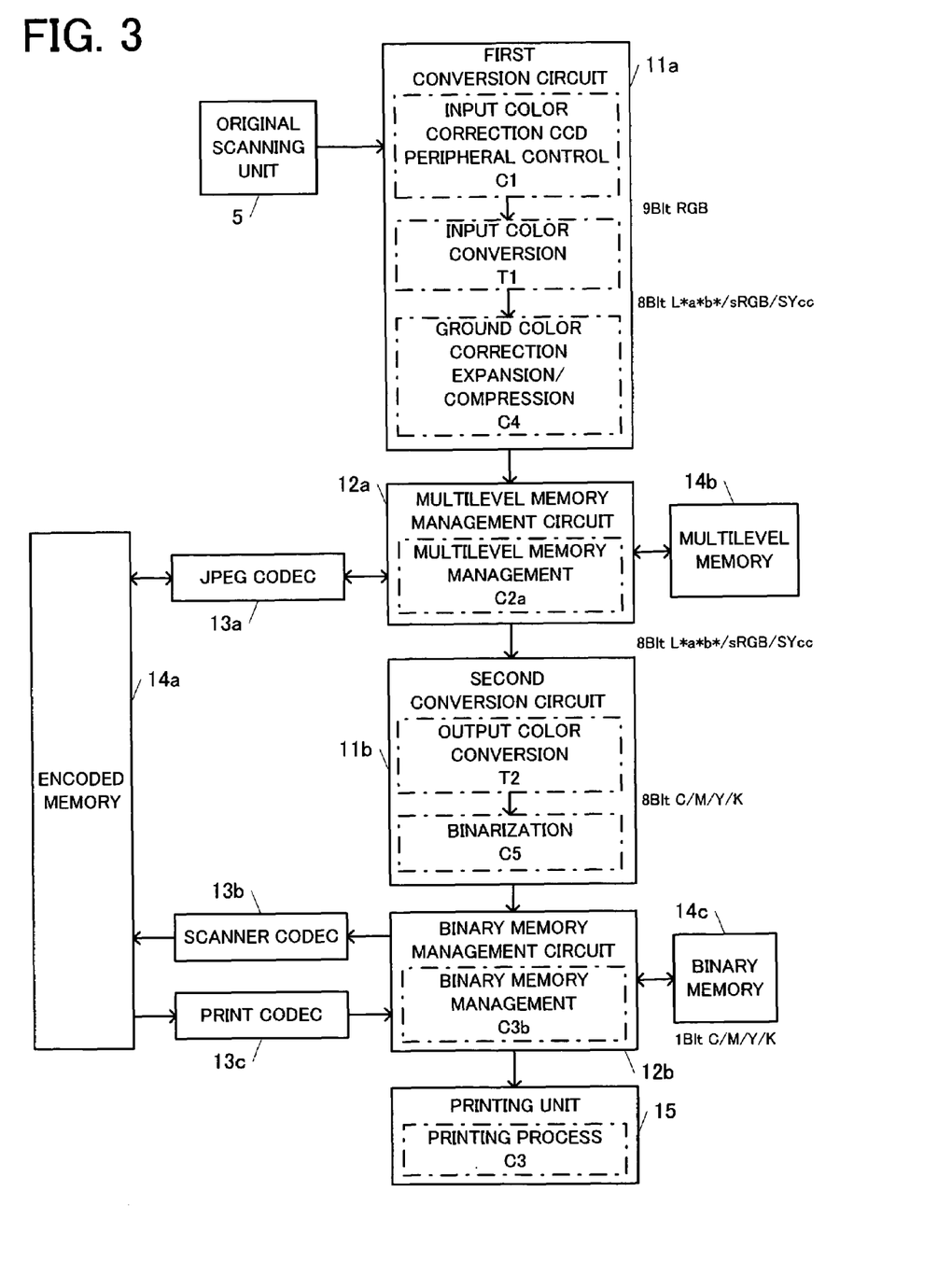
FIG. 3 shows a flow of data transfer in an image processing executed on image data of an original document scanned by an original scanning unit.

As shown in FIG. 3, the image data of the original document scanned by the color CCD of the original scanning unit 5 is converted into a digital signal by an Analog-to-Digital (AD) converter (not shown in the drawings). Then, image processing is executed on the image data by the first conversion circuit 11*a*, and the image data is stored temporarily into the multilevel memory 14*b*. That is, an input color correction of a shading correction, a line correction and a gap correction is executed in a process C1. In a process T1, an input color conversion from the RGB color system into the L*a*b color system or the like is carried out. In a process C4, an expansion, a compression, a ground color correction or the like are carried out. Then, the image data is temporarily stored into the multilevel memory 14*b* by the multilevel memory management circuit 12*a* (process C2*a* write). Further, when printing the color image data scanned by the original scanning unit 5 onto a recording paper in monochrome, the color image data is converted into monochrome image data in the process C4, and stored into the multilevel memory 14*b*.

Then, the image data stored temporarily in the multilevel memory 14*b* is fetched by the multilevel memory management circuit 12*a* (process C2*a* read), and sent to the second conversion circuit 11*b*. In a process T2, an output color conversion is carried out to convert the image data of the L*a*b color system into each of the color data of KCMY for printing the image data onto a recording paper. In a process C5, an error diffusion processing or the like is executed on the color data, which is converted into each of the output colors of KCMY, and the color data is binarized. Then, the binarized color data is stored temporarily into the binary memory 14*c* by the binary memory management circuit 12*b* (process C2*b* write).

Each of the color data stored in the binary memory 14*c* is fetched by the binary memory management circuit 12*b* (process C2*b* read), and sent to the scanner codec 13*b*. Then, the color data is encoded and stored into the encoded memory 14*a*.

The color data, which is encoded and stored in the encoded memory 14*a*, is decoded for each color data by the print codec 13*c* under a prescribed timing according to the operation of the printing unit 15. Then, the decoded color data is stored temporarily into the binary memory 14*c* by the binary memory management circuit 12*b*. At a stage when the decoding of each of the color data is completed for a number of pages that is necessary for printing onto a recording paper and each of the color data is stored into the binary memory 14*c*, each of the color data is fetched from the binary memory 14*c* by the binary memory management circuit 12*b* (process C2*b* read). Then, each of the color data is respectively sent to the printing unit 15.

An image processing such as a white mask or smoothing is executed on each of the color data sent to the printing unit 15, and the color data is printed onto a recording paper by the printing unit 15. Next, referring to FIG. 2 through FIG. 4, an example of the timing of the image processing carried out from the scanning process of the original document until the printing process by the printing unit 15, and a printing process of each of the color data carried out by the printing unit 15 will be described as an example of when the image data of multiple pages of original documents scanned by the original scanning unit 5 is printed by the two-up printing process onto a recording paper by the printing unit 15 shown in FIG. 2.

Figure 4:
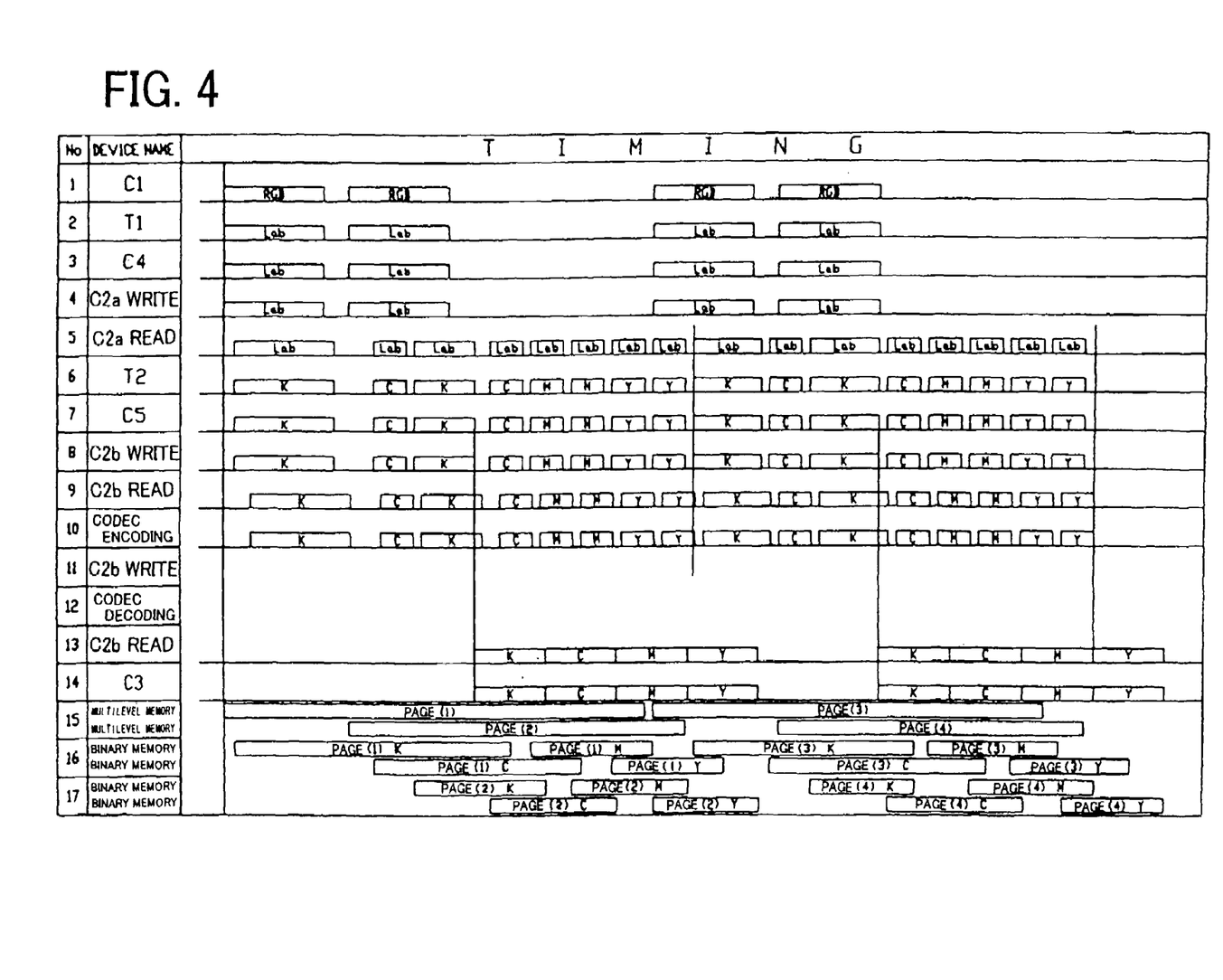
FIG. 4 shows an operation sequence in the image scanning and printing device when a two-up printing process is executed.

As shown in FIG. 3 and FIG. 4, various corrections, a color conversion or the like is executed by the first conversion circuit 11*a* on the image data scanned by the original scanning unit 5, and the image data is stored into the multilevel memory 14*b*. Then, the output color conversion is carried out in the process T2 by the second conversion circuit 11*b*. The output color conversion starts at a point when image data of a prescribed number of lines, for example, 100 lines, is stored into the multilevel memory 14*b*. This is for reducing a period of time from the scanning process of the image data of the original document until the output color conversion. Therefore, after the scanning process of the original documents by the original scanning unit 5 and the image processing by the first conversion circuit 11a are carried out, and the image data of a prescribed number of lines is scanned, a conversion process into the color data of the K component and the C component is carried out for the image data of the first page of the original documents, and a conversion process into the color data of the K component and the C component is carried out for the image data of the second page of the original documents. Then, a conversion process into the color data of the M component and the Y component is carried out for the image data of the first and the second pages of the original documents that have completed the scanning process and that are stored in the multilevel memory 14b.

Therefore, at a stage when the conversion process into the color data is completed for the K component of the second page of the original documents, the conversion process into color data is completed for the K component of the first and the second pages of the original documents, and image for two pages can be formed for the K component. Therefore, a process C in the printing unit 15 is started at this stage. That is, as shown in FIG. 2, the intermediate transfer belt 26, the intermediate transfer drum 25 and the transfer roller 29 are respectively rotated under a prescribed timing in a direction shown with an arrow, and a prescribed bias voltage is applied to the intermediate transfer drum 25, a charging device (not shown in the drawings) and the transfer roller 29. Then, an electrostatic latent image for the K component of the first and the second pages of the original documents is formed in accordance with the color data of the K component sent from the binary memory management circuit 12b to the intermediate transfer belt 26 by the exposing device 28. Next, the toner is developed on the intermediate transfer belt 26 by contacting K color toner 27a for the electrostatic latent image against the intermediate transfer belt 26. The developed toner image is transferred onto the intermediate transfer drum 25 by the rotation of the intermediate transfer belt 26 and the intermediate transfer drum 25. Then, a discharge and a cleaning process are executed on the intermediate transfer belt 26 to be prepared for the development of the other color data.

When carrying out the two-up printing process as described above, the conversion process into the first color data (in the present embodiment, the color data of the K component) for the image data of the second page of the original documents is carried out before completing the conversion process into the color data of all KCMY for the image data of the first page of the original documents. As a result, compared with a case in which the two-up printing process is carried out by converting the image of the second page into the color data after completing the conversion into all color data for the first page of the original documents, the image can be printed within a shorter period of time.

After the transfer process of the color data of the K component is completed, the above-described transfer process is carried out for each of the color data of the C component, the M component and the Y component, and color images 32a and 32b are formed on the intermediate transfer drum 25 for the two pages that are formed from four colors, KCMY. Next, two sheets of recording papers are supplied consecutively to a part between the intermediate transfer drum 25 and the transfer roller 29 from the paper tray 31 under a prescribed timing. In addition, by applying a prescribed transfer bias voltage, the color images 32a and 32b are transferred onto the two sheets of recording papers. After the recording papers transferred with the images are stripped by discharge, a heat processing is executed on the recording papers by the fuser 30 to fuse the color images 32a and 32b. Then, the recording papers are discharged onto a discharge paper tray (not shown in the drawings). Moreover, even when monochrome image is included in the image to be printed onto a recording paper, the image can be printed by the two-up printing process in the same manner.

In the above example, the two-up printing process was described. In case of other multi-up printing process, it is also preferable to convert image data of multiple pages of original documents for at least first color data, and after the conversion process for at least the first color data is completed, to start an operation for printing the image data onto a recording paper and to print the image onto multiple sheets of recording papers.

Next, in accordance with the flowchart shown in FIG. 5, an operation process for determining whether to execute a multi-up printing process or to execute a one-up printing process when printing onto a recording paper, the image data of the original documents placed on the ADF 5a or the FBS 5b, will be described for a case in which the multi-up printing process is a two-up printing process.

When an original document is placed on the original scanning unit 5, the control unit 2 determines whether the original document is placed on the ADF 5a or the FBS 5b (step S1). When the original document is placed on the FBS 5b (step S1: FBS), it can be determined that a number of original documents is one page. Then, it is determined whether or not the size of the recording paper, which is stored in the RAM 4 in advance based on the size of the original document detected at the scanning process of the original document and the output magnification configured in advance prior to the operation of the start key of the operation unit 6, is less than half of the maximum recording paper size which can be printed by the image scanning and printing device 1 (step S2). Further, the size that is less than half of the maximum recording paper size is a size in which when two sheets or more of recording papers are placed side by side, the recording papers fit within the maximum recording paper size. For example, when the maximum recording paper size which can be printed by the image scanning and printing device 1 is A3 size of the Japanese Industrial Standards, it is determined whether or not the size of the recording paper is A4R size or smaller, which corresponds to a size having a longitudinal length that is the same as that of the A3 size and a lateral length that is half of that of the A3 size. When the size of the recording paper to be printed with the image is not less than half of the maximum recording paper size which can be printed by the image scanning and printing device 1 (step S2: NO), since the image cannot be printed by the multi-up printing process, the image is printed by the one-up printing process (step S5). Further, when the output magnification is not configured in advance from the operation unit 6, the size of the original document detected by the original scanning unit 5 is stored into the RAM 4 as the size of the recording paper to which the image data of the original document is printed.

In step S2, when the size of the recording paper to be printed with the image is less than half of the maximum recording paper size which can be printed by the image scanning and printing device 1 (step S2: YES), it is determined whether or not a number of sets of sheets to be printed is two sets or more (step S3). Further, the number of sets of sheets to be printed is configured prior to the operation of the start key of the operation unit 6 and stored in the RAM 4 in advance. When the number of sets of sheets to be printed is not two sets or more (step S3: NO), it can be determined that the number of original documents is one page and the number of sets of sheets to be printed is one set. Therefore, since the number of sheets to be printed is one sheet, the image is printed by the one-up printing process (step S5). Meanwhile, when the number of sets of sheets to be printed is two sets or more (step S3: YES), it can be determined that the number of original documents is one sheet and the number of sets of sheets to be printed is two sets or more. Therefore, since the number of sheets to be printed is two sheets or more, the image is printed by the two-up printing process (step S4).

Meanwhile, when the original document is placed on the ADF 5a (step S1: ADF), it is determined whether or not the size of the recording paper is less than half of the maximum recording paper size which can be printed by the image scanning and printing device 1 (step S6). Further, the size of the recording paper is stored in the RAM 4 in advance based on the size of the original document detected by the ADF 5a and the output magnification configured prior to the operation of the start key of the operation unit 6. When the size is not less than half (step S6: NO), since the image cannot be printed by the multi-up printing process, the image is printed by the one-up printing process (step S11). Meanwhile, when the size of the recording paper to be printed with the image data of the original document is less than half of the maximum recording paper size which can be printed by the image scanning and printing device 1 (step S6: YES), the image data of the first page of the original documents is scanned (step S7). Here, since there is a possibility in which the original document is placed on the ADF 5a and the number of original documents is two sheets or more, it is detected whether or not there is a next page of the original documents at a stage the first page of the original documents is scanned (step S8). When the next page of the original documents is detected (step S8: YES), since the number of sheets to be printed becomes two sheets or more, the image is printed by the two-up printing process (step S9).

Meanwhile, when the next page of the original documents has not been detected on the ADF 5a (step S8: NO), the original documents include only one page. Therefore, it is determined whether or not the number of sets of sheets to be printed, which is set in advance from the operation unit 10, is two sets or more (step S10). When the number of sets of sheets to be printed is two sets or more (step S10: YES), it can be determined that the number of original documents is one sheet and the number of sets of sheets to be printed is two sets or more. Therefore, since the number of sheets to be printed is two sheets or more, the image data of the original document scanned in step S7 is two images formed on the intermediate transfer drum 25 in accordance with the image data of the original document scanned in step S7, and the images are printed by the two-up printing process (step S9). Moreover, when the number of sets of sheets to be printed that is set from the operation unit 6 is one set (step S10: NO), it can be determined that the number of the original documents is one page and the number of sets of sheets to be printed is one set. Therefore, since the number of sheets to be printed is one sheet, the image data scanned in step S7 is printed by the one-up printing process (step S11).

Figure 5:
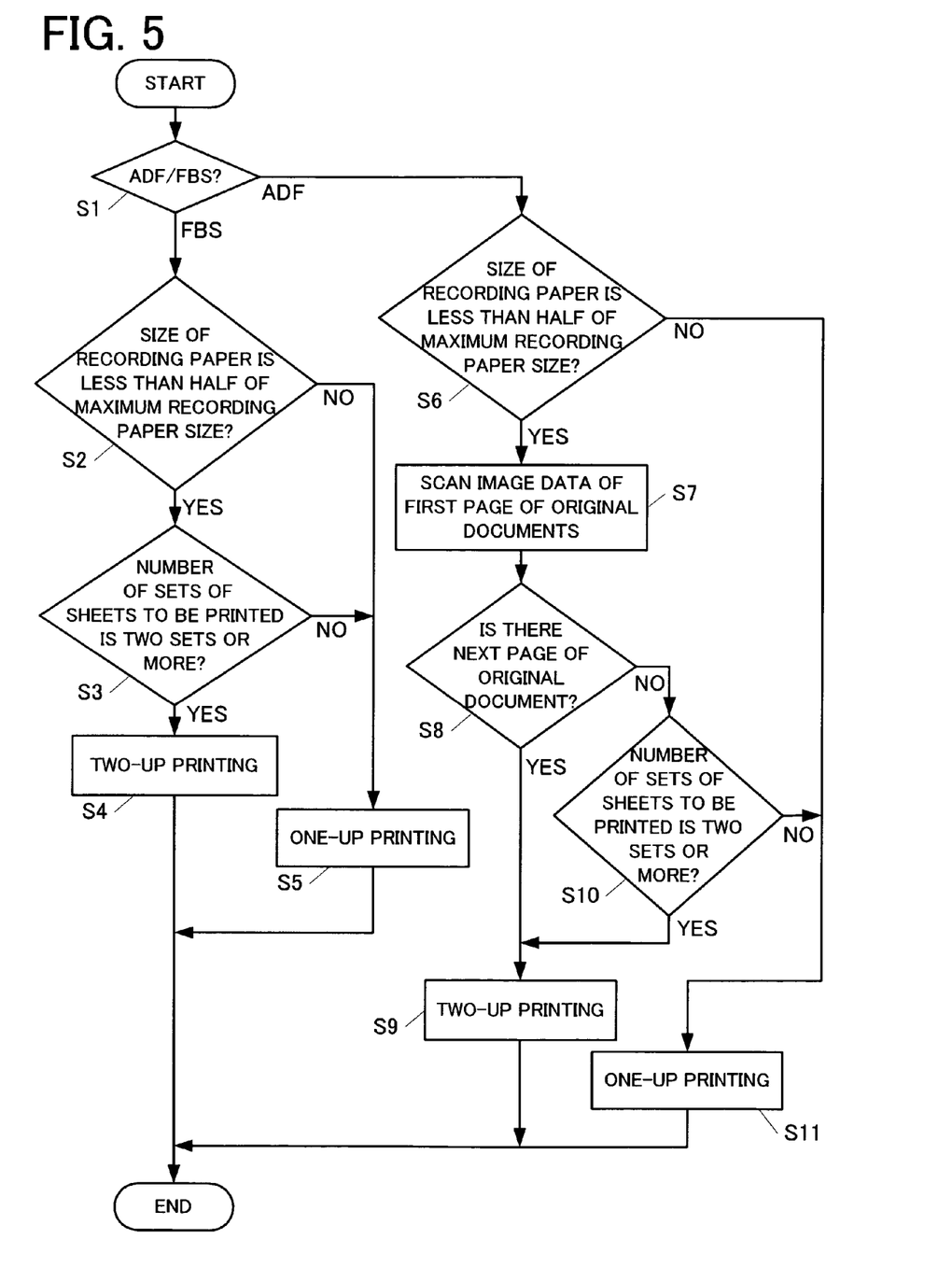
FIG. 5 is a flowchart showing an operation for determining whether or not the two-up printing process can be executed.

Further, when a configuration of sort is carried out in advance from the operation unit 6, it is determined that the number of sets of sheets to be printed is two sets or more in the determination of the number of sets of sheets to be printed that is carried out in accordance with the flowchart shown in FIG. 5. Moreover, even when printing the image by the two-up printing process, if the number of sheets to be printed is an odd number, the image is printed onto a last page of the recording papers by the one-up printing process.

In the present embodiment, the two-up printing process was described as an example of a multi-up printing process. However, the present invention can be also applied to a case in which an image is printed onto each of three sheets or more of recording papers in one printing process if it is designated to use a recording paper of a size which can be fit three sheets or more in a printable maximum recording paper size.

What is claimed is:

1. An image scanning and printing device comprising:
    means for printing an image onto each of multiple sheets of recording papers in one printing process by a multi-up printing process; and
    means for controlling to select and execute the multi-up printing process when a size of the recording paper, which is obtained based on a size of an original document and an output magnification, is less than half of a maximum recording paper size and a number of sheets to be printed, which is obtained based on a number of original documents and a number of sets of sheets to be printed, is two sheets or more, and to select and execute a one-up printing process otherwise,
    wherein in case image data of a scanned original document is converted into n-types of color data for a first color data to an n-th color data and the image data is printed onto a recording paper based on each of the color data, when carrying out the multi-up printing process by scanning plural pages of the original documents, the image data of the multiple pages of the original documents are respectively converted into at least the first color data, and an operation for printing the image data onto the recording paper starts.

2. The image scanning and printing device according to claim 1, wherein the means for printing uses an electrophotographic method.

3. The image scanning and printing device according to claim 1, further comprising a copy function.

4. The image scanning and printing device according to claim 1, further comprising an Internet function.

5. The image scanning and printing device according to claim 1, further comprising a facsimile function.

6. The image scanning and printing device according to claim 1, further comprising a network printer function.

7. An image scanning and printing device comprising:
    means for printing an image onto each of multiple sheets of recording papers in one printing process by a multi-up printing process; and
    means for controlling to select and execute the multi-up printing process when a size of a recording paper, which is obtained based on a size of an original document and an output magnification, is less than half of a maximum recording paper size and a next page of the original document detected at a stage a first page of the original document is scanned, and a number of sets of sheets to be printed is two sets or more, and to select and execute a one-up printing process otherwise,
    wherein in case image data of a scanned original document is converted into n-types of color data for a first color data to an n-th color data and the image data is printed onto a recording paper based on each of the color data, when carrying out the multi-up printing process by scanning plural pages of the original documents, the image data of the multiple pages of the original documents are respectively converted into at least the first color data, and an operation for printing the image data onto the recording paper starts.

8. The image scanning and printing device according to claim 7, wherein the means for printing uses an electro photographic method.

9. The image scanning and printing device according to claim 7, further comprising a copy function.

10. The image scanning and printing device according to claim 7, further comprising an Internet function.

11. The image scanning, and printing device according to claim 7, further comprising a facsimile function.

12. The image scanning and printing device according to claim 7, further comprising a network printer function.

13. An image scanning and printing device comprising:
a printing unit that prints an image onto each of multiple sheets of recording papers in one printing process by a multi-up printing process; and
a control unit that controls to select and execute the multi-up printing process when a size of the recording paper, which is obtained based on a size of an original document and an output magnification, is less than half of a maximum recording paper size and a number of sheets to be printed, which is obtained based on a number of original documents and a number of sets of sheets to be printed, is two sheets or more, and to select and execute a one-up printing process otherwise,
wherein in case image data of a scanned original document is converted into n-types of color data for a first color data to an n-th color data and the image data is printed onto a recording paper based on each of the color data, when carrying out the multi-up printing process by scanning plural pages of the original documents, the image data of the multiple pages of the original documents are respectively converted into at least the first color data, and an operation for printing the image data onto the recording paper starts.

14. The image scanning and printing device according to claim 13, wherein the printing unit uses an electro-photographic method.

15. The image scanning and printing device according to claim 13, further comprising a copy function.

16. The image scanning and printing device according to claim 13, further comprising an Internet function.

17. The image scanning and printing device according to claim 13, comprising a facsimile function.

18. The image scanning and printing device according to claim 13, further comprising a network printer function.

* * * * *